United States Patent [19]

Swanda

[11] Patent Number: 5,174,034
[45] Date of Patent: Dec. 29, 1992

[54] ALL-PURPOSE LEVEL

[76] Inventor: Richard L. Swanda, 1609 S. 27th Pl., Rogers, Ark. 72756

[21] Appl. No.: 827,419

[22] Filed: Jan. 29, 1992

[51] Int. Cl.⁵ ............................................. G01C 9/28
[52] U.S. Cl. ...................................... 33/365; 33/390; 33/374
[58] Field of Search ................. 33/365, 390, 374, 375, 33/376, 382, 383, 384

[56] References Cited

U.S. PATENT DOCUMENTS

| | | |
|---|---|---|
| 283,564 | 8/1883 | Butt . |
| 740,742 | 10/1903 | Bush . |
| 830,796 | 9/1906 | Masters . |
| 870,098 | 11/1907 | Hartshorn . |
| 2,559,961 | 7/1951 | Howell . |
| 2,752,692 | 7/1956 | Smith . |
| 2,826,823 | 3/1958 | Hagner ................................ 33/365 |
| 3,186,092 | 6/1965 | Bertas . |
| 3,293,755 | 12/1966 | Cronwell . |
| 3,751,819 | 8/1973 | Dixon . |
| 3,820,249 | 6/1974 | Stone ................ 33/382 X |
| 3,871,104 | 3/1975 | Underhill, II . |
| 4,260,151 | 4/1981 | Weaver . |
| 4,343,093 | 8/1982 | Eadens ................................ 33/373 |
| 4,514,908 | 5/1985 | Yamaguchi . |
| 4,934,706 | 6/1990 | Marshall . |
| 4,984,791 | 1/1991 | Labell . |

FOREIGN PATENT DOCUMENTS 318872 3/1957 Switzerland ........................ 33/390

Primary Examiner—Harry N. Haroian
Attorney, Agent, or Firm—Young & Thompson

[57] ABSTRACT

An all-purpose level in the form of a box that contains a ball rolling on an upwardly concave surface that is a figure of revolution about a vertical axis. The box rests on a member which will be horizontal when the level is in engagement with a truly vertical or horizontal surface. For this purpose, the member is disposed at a right angle to a plate which is hingedly connected to another plate about an axis perpendicular to the plane of the member. The member is selectively lockable in that perpendicular relationship; but when released, the member folds against the first-mentioned plate and the device thus folds about two hinges at right angles to each other, thereby to provide a configuration in which the level can rest on a generally horizontal surface to indicate true horizontal orientation thereof. Because the two plates are hinged to each other for swinging movement about the mentioned axis, the plates can be applied equally well against right angle vertical corners, or vertical cylindrical surfaces of any radius. The lowermost edges of the plates lie in a plane, when the plates form a dihedral with each other, which plane is parallel to the member that carries the box and so permits use of the device to indicate the horizontal orientation of an upwardly facing surface on which those lower edges are made to bear.

3 Claims, 1 Drawing Sheet

ALL-PURPOSE LEVEL

FIELD OF THE INVENTION

The present invention relates to an all-purpose level for use in any of a plurality of environments to indicate true vertical or true horizontal. The invention has particular utility for use in connection with positioning or checking horizontal and/or vertical members during installation or emplacement, to ensure that they are truly horizontal and/or vertical.

OBJECTS OF THE INVENTION

It is accordingly an object of the present invention to provide a level which readily indicates the location of the true vertical and/or horizontal in any of a plurality of environments.

Another object of the present invention is to provide a level with a ball rolling on arcuate surfaces, which readily indicates whether a member in contact with the support for the arcuate surfaces is vertical and/or horizontal.

Still another object of the present invention is the provision of an all-purpose level, which will be simple and inexpensive to manufacture, easy to use and to read, and rugged and durable in use.

SUMMARY OF THE INVENTION

Briefly stated, the present invention provides an all-purpose level in the form of a box that contains a ball rolling on an upwardly concave surface that is a figure of revolution about a vertical axis. The box rests on a member which will be horizontal when the level is in engagement with a truly vertical or horizontal surface. For this purpose, the member is disposed at a right angle to a plate which is hingedly connected to another plate about an axis perpendicular to the plane of the member. The member is selectively lockable in that perpendicular relationship; but when released, the member folds against the first-mentioned plate and the device thus folds about two hinges at right angles to each other, thereby to provide a configuration in which the level can rest on a generally horizontal surface to indicate true horizontal orientation thereof.

Because the two plates are hinged to each other for swinging movement about the mentioned axis, the plates can be applied equally well against right angle vertical corners, or vertical cylindrical surfaces of any radius.

The lowermost edges of the plates lie in a plane, when the plates form a dihedral with each other, which plane is parallel to the member that carries the box and so permits use of the device to indicate the horizontal orientation of an upwardly facing surface on which those lower edges are made to bear.

BRIEF DESCRIPTION OF THE DRAWINGS

The above and other objects and advantages of the present invention will become apparent from a consideration of the following description, taken in connection with the accompanying drawing, in which.

Figure 1:
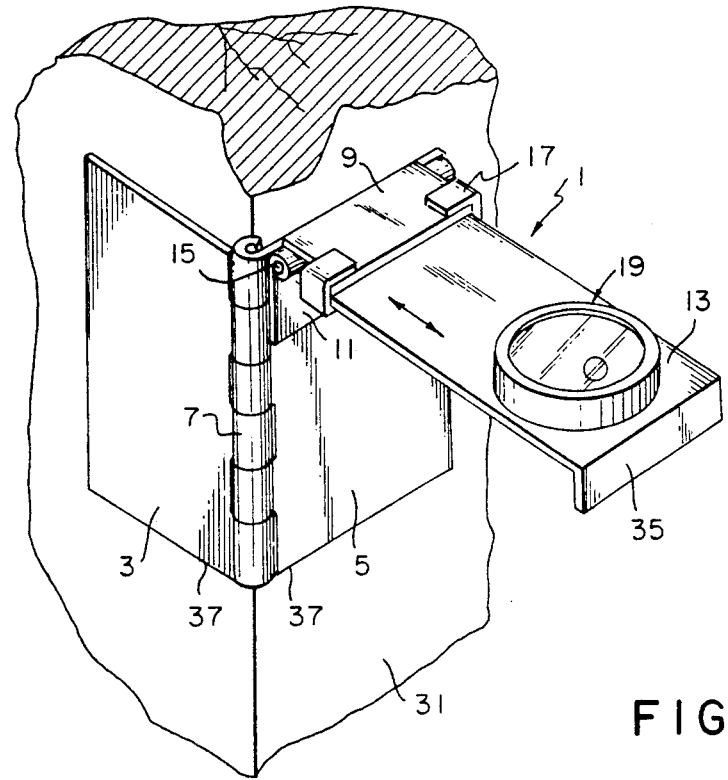
FIG. 1 is a perspective view of an all-purpose level according to the present invention, in place on an upright wooden post of rectangular cross section.

Referring now to the drawing in greater detail, there is shown a level 1 according to the present invention, comprised by two flat plates 3 and 5 hingedly interconnected about a hinge 7 for swinging movement relative to each other about approximately 270° of arc. When plates 3 and 5 are vertical, a flange 9 integral with plate 5 projects horizontally away from the plane of plate 5.

A strip 11 is secured to the same side of plate 5 from which flange 9 projects. Immediately adjacent flange 9 a leaf 13 is hingedly connected to that edge of strip 11 which is nearest flange 9, for swinging movement of plate 5 and leaf 13 relative to each other about a hinge 15 whose axis is perpendicular to that of hinge 7, i.e. horizontal in the FIG. 1 position thereof.

Figure 3:
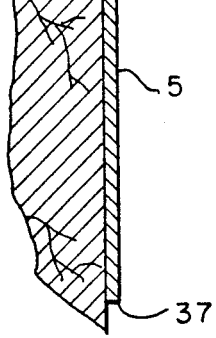
FIG. 3 is a cross sectional view of the level, in a vertical plane that includes the axis of the box.

When leaf 13 is swung upwardly, to the position of FIGS. 1 and 3, the upper surface of the hinged end thereof rests flat against the undersurface of flange 9. A slide 17 is slidable on and at least partially surrounds leaf 13, in the direction of the double arrows in FIGS. 1 and 3, between the position shown in FIGS. 1 and 3 in which slide 17 releasably holds flange 9 and leaf 13 together as a rigid unit, and a released position shown in FIG. 4 in which slide 17 no longer interferes with swinging movement of leaf 13 and flange relative to each other about hinge 15. When slide 17 is in the engaged or locking position shown in FIGS. 1 and 3, and plates 3 and 5 are vertical, then leaf 13 is horizontal.

Outwardly beyond the path of sliding movement of slide 17, leaf 13 carries on its upper surface a box 19 which is the level per se. In the illustrated embodiment, box 19 comprises a base 21 whose undersurface is flat and rests flatly against the flat upper surface of leaf 13 and so is horizontal in the position of FIGS. 1 and 3. Base 21 is peripherally surrounded by an upright circular side wall 23 which in turn is sealingly secured to the outer periphery of a transparent cover 25 which may be of glass but preferably is of hard plastic.

Within box 19 is a ball 27 which can roll in any direction on the upper surface of base 21. That upper surface is upwardly concave and is a figure of revolution about a vertical axis. Preferably, it is a spheroid, but of course it could also be a hyperboloid, a paraboloid or an ellipsoid. Centrally of the upper surface of base 21 is a reference mark 29, which for convenience can be circular and of about the same size as ball 27. Reference mark 29 is in the exact center, that is, at the lowermost point of the figure of revolution comprising the upper surface of base 21 and so is exactly centered on the vertical axis about which the upper surface of base 21 is a figure of revolution. This means that when the undersurface of base 21 is perfectly horizontal, then under the influence of gravity, ball 27 will be in exact registry, as seen from above, with reference mark 29.

Figure 2:
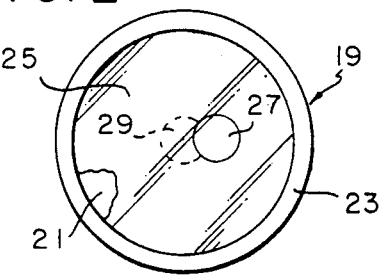
FIG. 2 is a top plan view of the box that contains the ball.

Thus, any deviation of the lower surface of base 21 from the horizontal, which is to say any deviation of leaf 13 from the horizontal or, in the position of FIGS. 1 and 3, any deviation of plates 3 and 5 from the vertical, will thus be indicated by a displacement of ball 27 from registry with reference mark 29, as shown for example in FIG. 2 of the drawing. This of course is true for an inclination in any direction, the amount of displacement of ball 27 from registry with reference mark 29 indicating the degree to which the measured surface departs from the horizontal, and the position of ball 27 about reference mark 29 indicating the direction in which that departure from horizontality takes place. Of course, the longer the radius of curvature of the upper surface of base 21, the more sensitive will be the indication given by the position of ball 27.

A number of uses of the device in various environments flow from the structure recited above, and it is for this reason that the present invention is accurately referred to as an all-purpose leveler. One of those uses is shown in FIG. 1, in which a vertical wooden post 31 of rectangular cross sectional configuration is being tested as to its verticality. To do this, the two plates 3 and 5 are pressed flat against the post 31 on opposite side of a vertical edge thereof, thereby ensuring that hinge 7 is parallel to that edge and hence vertical if and only if the post itself is truly vertical. If hinge 7 is truly vertical, then hinge 15 is truly horizontal and so is leaf 13, and with it the lower surface of base 21 of box 19. In that circumstance, ball 27 will be seen from above to be in exact registry with reference mark 29 and post 31 can accordingly be secured in place.

Figure 4:
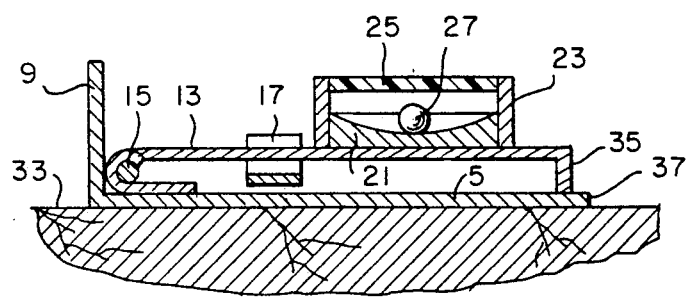
FIG. 4 is a view similar to FIG. 3 but showing the device in another configuration for the determination of the horizontality of an upwardly facing surface.

But the all-purpose level of the present invention can also be used for the determination of the true horizontality of an upwardly facing surface, as shown in FIG. 4, in which the device now rests on the upper surface of a horizontal member 33. In this configuration of the device, slide 17 has been disengaged from flange 9 and leaf 13 has been swung toward plate 5. A lip 35 on the outer end of leaf 13 contacts plate 5 and ensures that leaf 13 is exactly parallel to plate 5. In this position, when plate 5 rests on a perfectly horizontal surface, leaf 13 will be perfectly horizontal, the lower surface of base 21 will be perfectly horizontal, and ball 27 will register exactly with reference mark 29 as seen from above.

When performing the measurement of FIG. 4, the other plate 3 can be extended and coplanar with plate 5, or it can be folded under plate 5 provided that in this folded position it is exactly parallel to plate 5 and presents a downwardly facing support surface which preserves the horizontality of plate 5 when plate 3 thus rests on a truly horizontal surface.

But the device of the present invention is also useful to determine the horizontality of surfaces, in the configuration of FIGS. 1 and 3. This is because the lower edges 37 of plates 3 and 5 lie in a plane which is exactly parallel to leaf 13 and hence the underside of base 21 of box 19, when the plates 3 and 5 form a dihedral angle with each other, that is, any angle other than the 180° angle in which plates 3 and 5 are coplanar. The use of the device in the configuration of FIGS. 1 and 3, to determine horizontality by resting the device on its edges 37, is advantageous if the surface to be measured is not a large flat surface such as would give a meaningful indication when the device is used in its FIG. 4 configuration.

Figure 5:
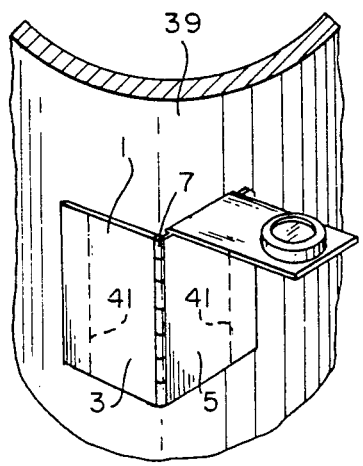
FIG. 5 is a somewhat schematic view similar to FIG. 1 but on a smaller scale, showing the device in use for determining the verticality of a cylindrical member.

Moreover, the all-purpose level of the present invention is not confined to use in connection with flat surfaces. It is also useful to determine the verticality of a cylindrical surface, as shown in FIG. 5. FIG. 5 shows the level applied to the outer cylindrical surface of a circular post 39. Depending on the radius of post 39, the plates 3 or 5 will be at a greater or lesser angle relative to each other, which angle can be either acute or obtuse. In either event, each plate 3 and 5 will contact post 39 along a vertical line 41 parallel to hinge 7, because of course the tangent of a plane to a cylinder is a straight line parallel to the axis of the cylinder. Thus, if post 39 is vertical, so will lines 41 be vertical and so will hinge 7, which means that hinge 15 will be horizontal, and with it leaf 13 and the underside of base 21, which, as before, will be indicated by exact registry of ball 27 with reference mark 29.

In view of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. A level comprising a pair of flat plates interconnected for relative swinging movement about an axis, a member carried by one of said plates and extending away from said one plate perpendicular to said axis, said member carrying means to indicate deviation of said member from horizontally in any direction, a hinge by which said member is connected to said one plate for relative swinging movement about a second axis perpendicular to the first-mentioned axis, and means for selectively permitting or preventing swinging movement of said member about said second axis, between positions in which said member is respectively perpendicular to said one plate and parallel to said one plate.

2. A level as claimed in claim 1, said indicating means comprising a box containing a ball that rests on an upwardly concave surface which is a figure of revolution about a vertical axis, and means to indicate the location of said axis on said surface thereby to indicate the direction and magnitude of departure from horizontally of said member.

3. A level as claimed in claim 1, said one plate having a flange thereon perpendicular to said one plate and disposed closely adjacent and parallel to said second axis, said member comprising a third plate swingable about said second axis into surface-to-surface contact with said flange, and said means for selectively permitting or preventing swinging movement of said member about said second axis comprising a slide that slides on said member in a direction perpendicular to said second axis between a position in which said slide is out of contact with said flange and a position in which said slide is in contact with said flange and holds said member perpendicular to said one plate.

* * * * *